Dec. 9, 1941.  R. J. WHITE  2,265,213
AIRCRAFT CONTROL
Filed June 11, 1940  3 Sheets-Sheet 3
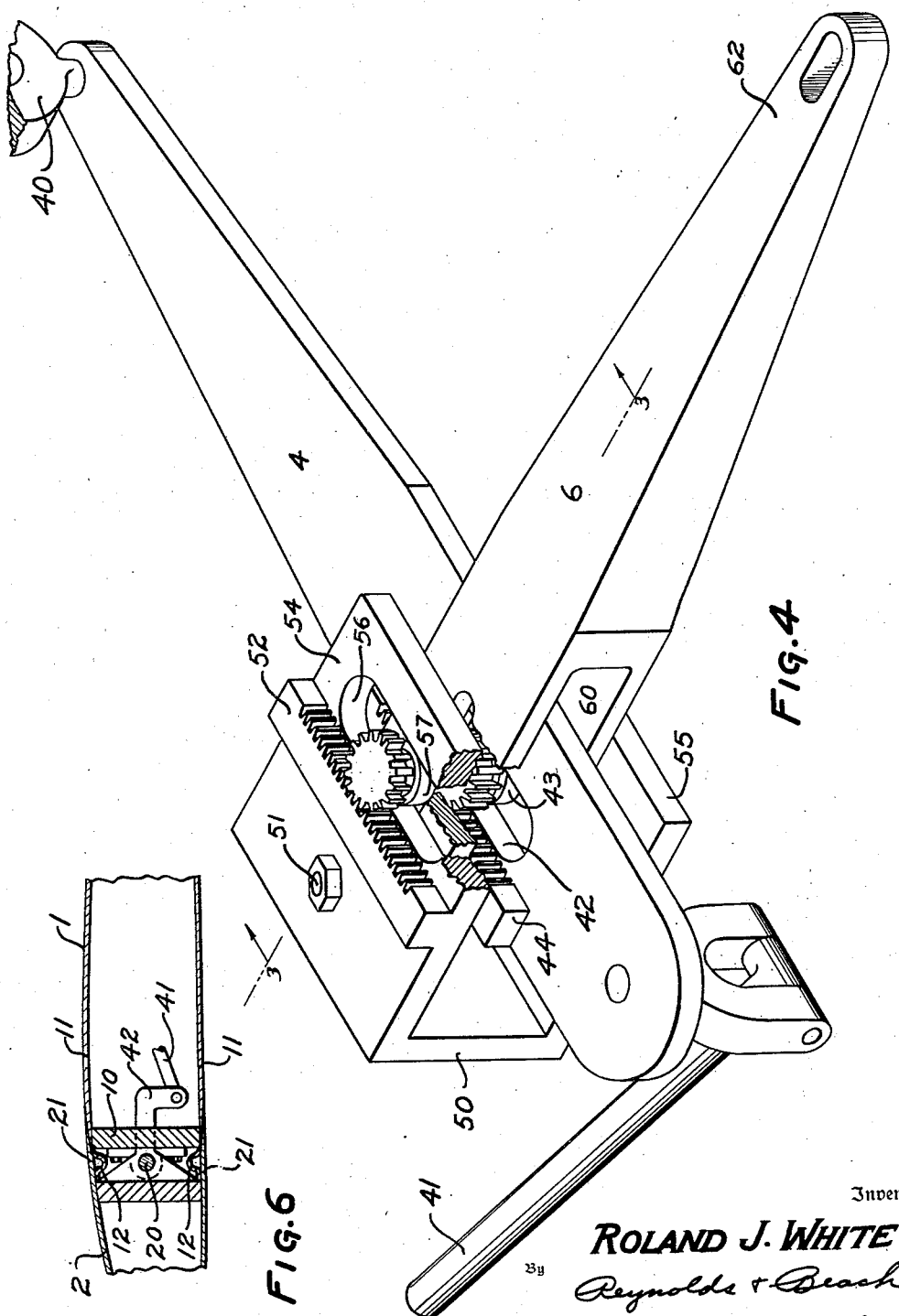
Inventor
ROLAND J. WHITE
By Reynolds & Beach
Attorney Patented Dec. 9, 1941

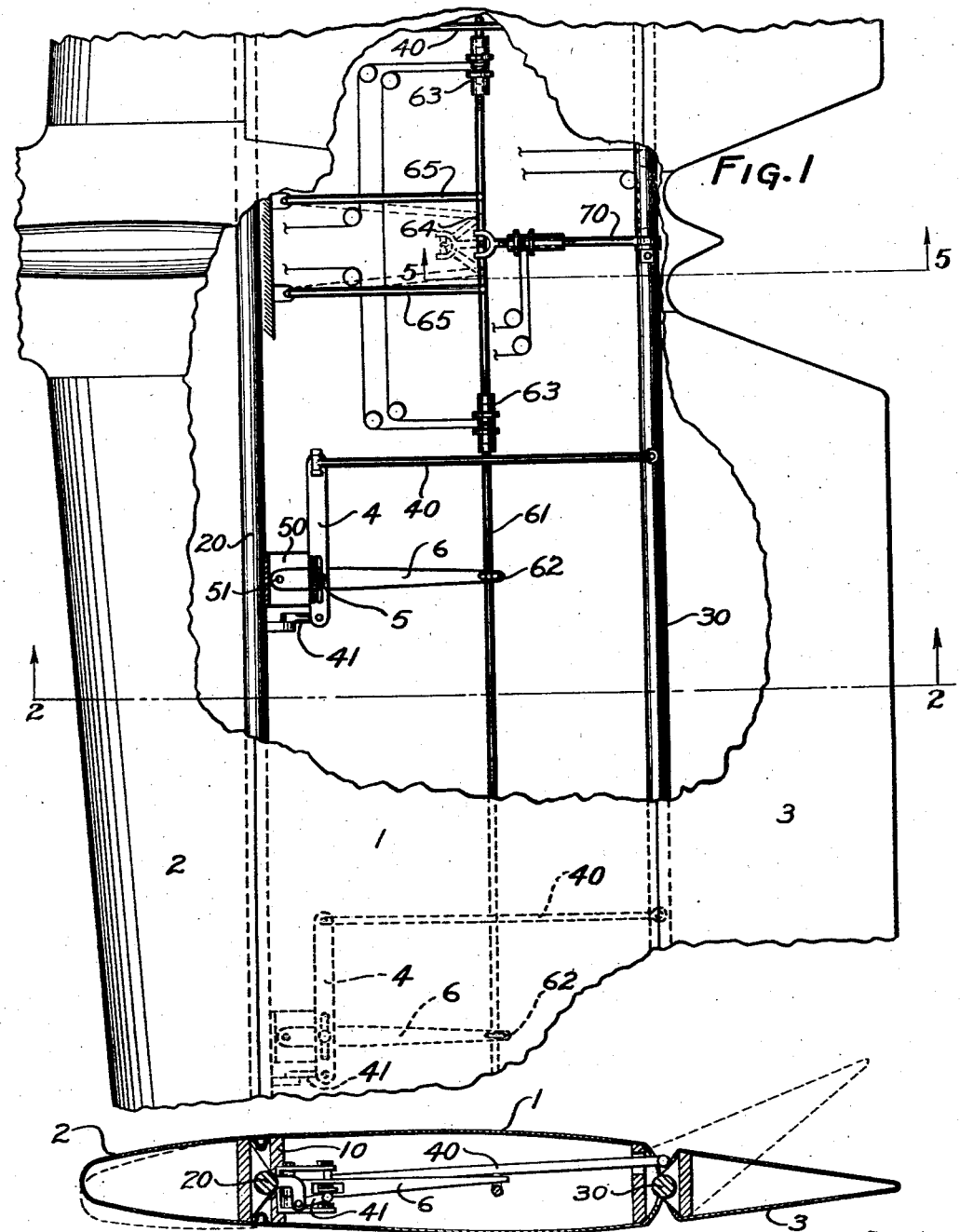

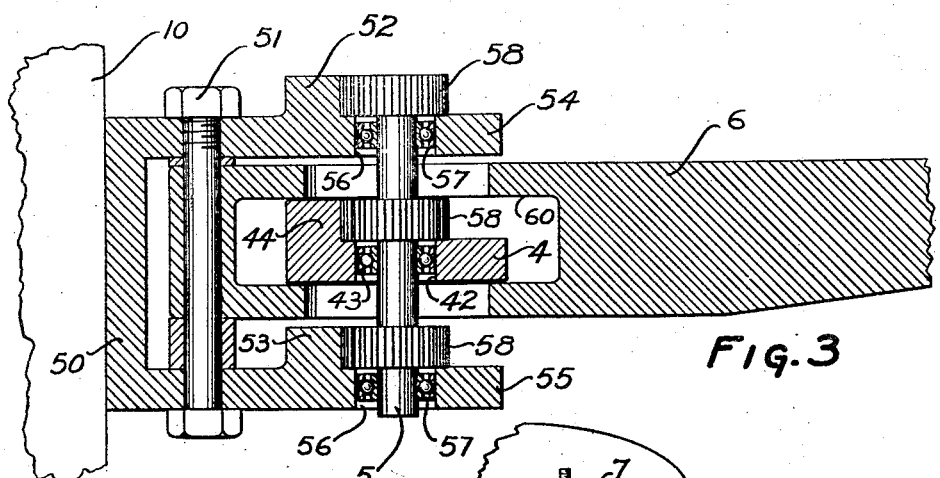

2,265,213

UNITED STATES PATENT OFFICE 2,265,213

AIRCRAFT CONTROL

Roland J. White, Seattle, Wash.

Application June 11, 1940, Serial No. 339,901

17 Claims. (Cl. 244—87)

My invention pertains to a stabilizer and control surface arrangement for aircraft, particularly of the heavier-than-air type, and may be utilized either in the directional control assembly or in the elevator control assembly.

The primary purpose of the airplane tail group is to provide stability and controllability for the aircraft. The better its stability characteristics, therefore, the smaller need be the area of its stabilizing surfaces, and hence the lighter may be the structure. If in addition the amount of effort required to accomplish the control movement necessary to produce a given lift or control force can be diminished, a further advantage is obtained.

The conventional and almost universal practice at present is to provide vertical and horizontal tail surfaces each consisting of a stationary forward or stabilizer portion, and a swingable rearward control surface portion pivoted to the rear edge of the stabilizer portion. The stabilizer is of the stationary type even though it be adjustable to assume various stationary trimming positions. My construction divides the normal forward portion into a stationary central portion and a movable nose or leading edge balance portion, which may be pivoted to the forward edge of the center section, and which is interconnected with the pivoted trailing edge control surface to swing in the same sense with respect to the stabilizer portion, but to a different degree. Thus when the control surface swings in a clockwise direction the balance member will also pivot in a clockwise direction, and vice versa, but the forward free edge of the balance member will move toward one side of the stabilizer section while the rearward free edge of the control surface will move toward the opposite side of the central section. Moreover for a given angular movement of the control surface the corresponding angular movement of the balance surface will be much less. Mechanism interconnecting the movable forward and rearward sections is provided so that the desired relationship is always maintained whether the primary movement is imparted to the balance or to the control surface, and whether such displacement is effected by control means or by aerodynamic action.

A mere coordinated movement of the forward and rearward sections is insufficient since the relative degrees of movement and areas of the movable portions are exceedingly important factors. In order to obtain sufficient controllability of an airplane, provision should be made for swinging the control surfaces through an angle of about 30° either side of the neutral position. If the interconnected leading edge member should swing through an equal angle the aerodynamic characteristics of the assembly would be entirely disrupted and it would be rendered unstable.

I have found that a control surface assembly in which the balance or leading edge section is approximately 30% of the total chord, and the control or trailing edge section approximately 35% of the total chord, is satisfactory when the angular movement of the control surface is five times or more as great as the angular movement of the balance member. If the area of the balance portion were reduced somewhat greater proportionate deflection might be desirable.

In order to enable the operating characteristics of my device to be altered according to the particular installation in which it is used, and also depending upon the operating characteristics desired in a given installation at any time, I have devised a linkage the balance to control surface movement ratio of which may be changed at the will of the pilot, or which ratio may be changed automatically in response to the amount of departure of the control surface from neutral position. If mechanism for effecting such automatic change is provided, manual controls may be included for altering the degree of its effectiveness, that is, the rate and extent of ratio change effected, or for shifting the position corresponding to the limiting movement ratio. Such operation may be accomplished by providing in the linkage which coordinates balance and control surface movement a lever the pivot point of which can be moved manually or automatically to afford the operation described.

My principal object, therefore, is to provide a three-part balance, stabilizer and control surface assembly which will have superior stability characteristics, and which in addition will decrease the effort which the pilot must exert in moving the control surface portion of such assembly.

A more specific object is to provide such a three-part assembly in which a leading edge balance section is entrained for movement with a trailing edge control section for pivotal movement in the same sense, but connected so that for any given angular movement of the balance section the control section will move through a substantially greater angle.

It is a further object to provide pilot-operated and automatic controls for such a three-part assembly, such that the movement ratio between the balance section and the control section may be altered through a wide range, and the amount of automatic change in movement ratio of the interconnected movable members effected by their movement from neutral position may be adjusted, or such automatic control eliminated.

Still another object is to provide mechanism for accomplishing these functions which will be of relatively simple construction, and which may readily be modified to omit any one or more of the control adjustments or regulating actions without interfering with the operation of the others.

Further objects will be evident from the description of a representative embodiment of my invention presented hereafter.

The drawings illustrate one type of mechanism which may be employed to accomplish the operation which I desire. Such mechanism is illustrated as a linkage interconnecting the movable balance and control portions of my control surface assembly, but it will be understood that other types of mechanical connection, a hydraulic system, or an electric installation may be employed, if desired, to accomplish the mechanical movements required for the operation of my device. Also various changes may be made in the size and nature of the movable and fixed surfaces and types of control afforded, all within the scope of the appended claims.

Figure 1 is a plan view of my composite surface, showing parts broken away to reveal the operating mechanism.

Figure 2 is a transverse section of my device, taken along line 2—2 of Figure 1.

Figure 3 is a detail section through a portion of the operating mechanism taken along line 3—3 of Figure 4.

Figure 4 is a perspective view of the operating linkage shown in Figure 1.

Figure 5 is a detail view of a portion of my operating mechanism, taken along line 5—5 of Figure 1.

Figure 6 is a detail view of a representative joint between the leading edge section and the stationary center section, also illustrating the operating mechanism for swinging the leading edge section.

Figures 7, 8 and 9 are diagrammatic views illustrating the operating characteristics of my device in contrast to that of conventional devices under particular operating conditions.

Figure 10 is a graph illustrating the operating characteristics of various mechanisms including those shown in Figures 7, 8 and 9.

In the performance of its principal function, namely, that of rendering an aircraft such as an airplane stable, when a gust of wind depresses the tail, for example, a stabilizer assembly must have the ability to create a restoring lift which will raise the tail back to its original position, without control movement on the part of the pilot. The ability of a given installation to perform such function is an important measure of its effectiveness. Experiments have shown that should the conventional elevator assembly be placed at an angle of attack of 5°, simulating a condition in which the tail of the airplane has encountered a downward gust, the freely pivoted elevator floats upward through 2° so that it has an angle of attack of only 3°, resulting in a convex camber effect on the lower side of the composite surface, as shown in Figure 9. The desired restoring effect is the creation of a lift, so that the tail will be brought back into alignment with the air stream. A restoring effect superior to that of the arrangement of Figure 9 would be obtained if the elevator were locked in position, as shown in Figure 8, for in that case a straight surface would be maintained instead of a negative or convex camber being created.

With my arrangement, however, experiments have shown that under these conditions the elevator, instead of floating somewhat upward, is actually depressed by action of the leading edge balance section being moved upward, so that instead of a convex camber being created, a concave camber results, as shown in Figure 7, which is much more effective in creating the necessary restoring lift. Reference to Figure 10 shows the superiority of my arrangement as determined from experiments. In this graph the angle of attack $a$ is plotted on the abscissae, while the lift coefficient of the assembly $Cl$ is plotted along the ordinates. N is the ratio of control surface movement to balance section movement, in this case the control surface being the elevator. Thus where N equals 5.2, as indicated on the upper curve, the elevator moves through an angle 5.2 times as great as the corresponding angular movement of the nose balance section. Since in the conventional assembly illustrated in Figure 9 the nose section does not move at all for movement of the elevator, N is equal to infinity, as shown by the lower curve in Figure 10. Figure 7 illustrates the assembly where N equals 5.2. In this instance the stabilizer center section is at an angle of attack of 5°, and under such conditions the balance section is deflected upward about 2°, giving it an angle of attack of 7°, and causing it to move the elevator downward nearly 11°, resulting in an angle of attack of nearly 16°. The restoring lift coefficient of this concave camber, high angle of attack assembly under the conditions of Figure 7, as shown by the graph of Figure 10, is 0.9. The lift coefficient as ascertained from this figure for the conditions of Figure 8 is 0.4, while the lift coefficient for the normal stabilizer and control surface assembly, under the conditions of Figure 9, is only 0.35. For a given area of tail surface assembly, therefore, over 2½ times as much restoring lift is afforded in this instance by my assembly as by the conventional arrangement. Other examples giving similarly favorable results may be worked out from the chart of Figure 10.

Since such excellent results are obtained by the use of my arrangement, the question naturally arises as to why the ratio of control to balance surface may not be still farther reduced, for example to a ratio of 1:1 instead of 5.2:1. As has been pointed out, to afford proper control, the elevator or control surface should be effective through an angle of swing 30° either side of the neutral position. If a control surface to balance section movement ratio of 3:1 were employed, when the control surface had moved through a 30° angle the balance surface would have moved through a 10° angle, and under these conditions the assembly, instead of giving a controlling lift, would have reached the stall position for a very small angle of attack of the center portion, so that the lift would be drastically reduced. This is the condition where the balance surface is approximately 30% and the control surface about 35% of the total chord of the assembly. The stall position would have been reached with such a structure when the center surface had been deflected as much as 5° to the relative wind.

Not only would the composite airfoil have reached the stall angle, so that the lift would be destroyed, but instead of effort by the pilot being required to move the control surface beyond a certain deflected position the balance would render the assembly statically unstable, and tend to deflect the control surface farther, requiring the pilot to exert a reverse force on the controls to return the control surface toward neutral position instead of such return being accomplished by aerodynamic forces. If the area of the balance surface were reduced these effects would, of course, be diminished, so that the stall position and the statically unstable condition would not be reached as quickly, and a lower movement ratio might be employed. In order to enable such ratio to approach unity it would be necessary to make the balance surface very small and enable it to have a large angular departure. Such conditions are not desirable, however, because large deflection of the balance would cause it to act as a spoiler, again disrupting the lift characteristics of the assembly and failing to obtain the superior restoring action of which my invention is capable. I have found, therefore, that the use of a leading edge balancing portion not appreciably less than 30% of the composite chord, cooperating with a control section of approximately 35% of the composite chord, is suitable where the ratio of control surface to balance section movement is within the range of 5:1 to 12:1.

As previously discussed, it is preferred that the center section 1 of the assembly be stationary, and that the balance section or member 2 be supported from the front edge of this center section, whereas the control surface 3 is of the conventional type, and is supported from the rear edge of the center section. Conveniently the balance member may be pivoted to the front spar 10 by a pivot rod 20. As shown in Figure 6, appropriate mechanism should be provided for making a smooth junction between the movable balance and the stationary stabilizer sections. For this purpose the skin of the balance section, which may be of resilient sheet metal, may be extended rearwardly at 21 to overlap the surface 11 of the stabilizer, but such lapping edge will be feathered, so that no projection to interfere with the smooth flow of air over the joint will be left. A pressure seal 12 may also be provided, so that no slot effect is afforded between the leading edge and center section. The control surface 3 may be pivoted by a rod 30 to the trailing edge of the center section in the conventional manner.

Any suitable mechanism may be employed for inter-connecting the balance and control sections so that they will move conjointly. Thus when the nose section moves toward the lower side of the center section the control surface will move toward the upper side of the center section, as shown in broken lines in Figure 2. When pivoted nose and tail sections, as shown, are employed, this action is accomplished by swinging both in the same sense or direction about their respective pivots 20 and 30, but because the pivot 20 is located along the rear edge of the balance portion 2, whereas the pivot 30 supports the front edge of the control surface 3, the actual displacement will be in opposite directions. In the example given rotation of both leading edge and trailing edge members will be in the same counterclockwise sense, and upon movement of either in the opposite direction the other will follow in a clockwise sense.

While, as has been pointed out, any of various types of operative connection may be employed for obtaining the desired mechanical movement, I have found that simple and adequate control is afforded by use of the mechanical linkage illustrated, and which may be housed completely within the aircraft structure. Its basis is a lever 4, to one end of which is connected a link 40 fastened to a horn for swinging control surface 3 about its pivot, and to the other end of which is connected a link 41 secured to a horn 42, such as shown in Figure 6, for swinging the balance section. The connection of these links with lever 4 is preferably of the universal joint type, as shown, so that no binding will occur during movement of the parts.

In order to afford the proper movement ratio, the fulcrum pivot 5 of lever 4 is disposed farther from the connection of control link 40 with the lever than the connection of balance link 41. Thus if a fixed movement ratio of 8:1, corresponding to the curve N=8 of Figure 10, is selected the pivot 5 would be fixed at a point eight times as far away from the connection between lever 4 and link 40 as the connection between this lever and link 41. Such a fixed pivot could, of course, establish any desired movement ratio, and if no adjusting mechanism were provided such ratio would be maintained over the complete range of control surface movement. I prefer, however, to provide mechanism for adjusting the position of pivot 5, which will enable the movement ratio to be altered at the will of the pilot, and which further may be arranged to provide automatic change of movement ratio as the control surface departs farther from its neutral position in alignment with the center section 1.

The type of pivot shifting mechanism which I now prefer includes a bracket 50 which will be fixed to the center section of the assembly, for example being mounted upon the spar 10, as shown in Figure 3. This bracket carries a fixed pin 51 upon which a pivot control lever 6 is swiveled. Swinging of this lever will move the position of pivot 5, about which lever 4 turns, lengthwise of this latter lever to vary the balance section to control surface movement ratio. A slot 42 extending lengthwise of the lever 4 may receive therethrough the pivot pin 5, preferably journaled in a suitable anti-friction bearing 43. A rack 44 integral with lever 4 is disposed in registry with racks 52 and 53 mounted on top and bottom flanges 54 and 55, respectively, of bracket 50. These flanges 54 and 55 are also slotted at 56 adjacent to the racks 52 and 53 to correspond to the slot 42 in lever 4, and are provided with similar antifriction bearings 57. The pivot pin 5 is journaled in all of the bearings 43 and 57, and is provided with three pinions 58, fixed thereto in positions to mesh with the racks 44, 52, and 53, respectively.

It will now be evident that as the pivot pin 5 is shifted lengthwise of the slots 42 and 56 the pinions 58 will roll along the racks, so that the lever 4 will be maintained in the same longitudinal position with respect to the bracket 50 at all times, although the lever pivot pin is shifted. This lever, it will be noted in Figure 1, is sufficiently long that its angular movement about the pivot 5 will be slight, and hence no appreciable change in movement ratio will be effected merely by swinging of this lever. A wide variation in movement ratio may therefore be effected by shifting the pivot pin 5 from one end to the other of lever slot 42 and the corresponding bracket slots 56. Translation of pivot pin 5 is accomplished by swinging lever 6 about its pivot 51. A slot 60 is provided in the lever 6 which supports lever 4. The entire control over the movement ratio, both manual and automatic, is therefore accomplished by providing suitable mechanism for controlling the swinging of lever 6.

Such lever control mechanism may constitute primarily an operating rod 61 which interconnects the swinging ends 62 of all the levers 6, if several interconnecting linkages are employed, as indicated in Figure 1. If only manually operated controls are desired a drum 63 having a turnbuckle action is all that is necessary. In such case the portion of rod 61 between the two drums 63 in Figure 1 would be mounted rigidly, and would be of fixed length. Thus when the drums 63 were rotated they would be rotated in the same direction, accomplishing simultaneous and equal movement of each rod 61 towards or away from the center line of the airplane. As the swinging ends 62 of levers 6 are swung towards the center line of the airplane, the movement ratio will be decreased, whereas when these swinging ends were moved farther from the center line of the airplane the shorter portion of lever 4 is decreased still further in length, thus increasing the movement ratio between the control and balance surfaces.

Automatic movement ratio control mechanism may be provided in addition to or instead of the manual control 63. Such automatic control mechanism is shown in detail in Figure 5. Not only does the provision of the balance portion 2 improve the stability characteristics of the composite surface, but the opposite deflection of the leading edge portion, as shown in Figure 2, assists the pilot in moving the control surface 3 by reason of the action of the air thereon. Since a proportionately greater effort is required to move the control surface as it departs farther and farther from neutral position it may be desirable to decrease the movement ratio, and thus increase the balancing action of section 2 for a greater angular departure of control surface 3 from its neutral position.

For such purpose an arm 7, swingable with the control surface 3, is connected by a link 70 to toggle linkage 64 interconnected between the parts of operating rod 61 on opposite sides of the center line of the aircraft. As the arm 7 is moved either direction by displacement of control surface 3 from neutral position, as shown in Figure 5, the links 64 are moved in one direction or the other out of alignment with rods 61, thus effecting endwise movement of both such rods toward the center, resulting in a decrease in movement ratio. The greater the angular deflection of control surface 3, the farther will links 64 move out of alignment to swing levers 6, and as a result the more will the movement ratio of control surface to balance surface be reduced.

When such toggle linkage is employed a guide 71 is provided to maintain the center pivot of linkage 64 in fore and aft alignment, so that the movement of rod 61 on opposite sides of the center line of the tail will be equal and opposite. In addition parallel links 65 are provided to maintain the operating rods 61 in alignment.

For a given installation it is likely that the proper length of arm 7 can be calculated so that it will be of fixed length. This control mechanism may be made more flexible, however, by providing a manually operable control, including a reel 72 which turns a lead screw 73 threaded in a nut 74 on the end of rod 71, which will enable the effective length of arm 7 to be changed at the will of the pilot. For any given angular movement of control 3, therefore, the amount of movement ratio change effected by this automatic control may be varied. In fact this control may be constructed to enable the nut 74 to be moved into alignment with the pivot axis of control 3, in which case the automatic movement would be rendered ineffective.

A still further control may be provided by employing a drum 75 interposed in link 70 which has a turnbuckle action to lengthen or shorten this connecting link. By moving this control the linkage 64 may be moved initially to an off-center position, so that the movement ratio will decrease more rapidly as the control surface is moved to one side of its neutral position than it will when moved to the opposite side of its neutral position. When my mechanism is applied to the horizontal tail surfaces, for example, movement of the elevator in a downward direction is facilitated by gravity acting upon the elevator, whereas movement in an upward direction is against the action of gravity. Thus reel 75 may be moved to lengthen link 70, so that as the elevator is moved downward the movement ratio will not begin to decrease as soon as when the elevator is moved in an upward direction. Greater assistance is thus afforded the pilot for swinging the elevator upward than downward.

It will be evident from the above description that any of the manual or automatic controls may be eliminated without affecting the others not directly dependent thereon. An automatic control having a fixed type of operation may be used. In its simplest form the pivot of lever 4 may be fixed, so that the complications of manual and automatic control are entirely eliminated. Moreover it is to be understood that instead of connecting link 40 directly to the main control surface 3, this link could operate a servo tab, which in turn would effect movement of the main control surface by aerodynamic action. Should the nose balance be attached to a servo control tab the small forces required to move such a tab would require a very small balance area which may be provided by a small section of the stabilizer or even a small surface incorporated within the nose of the stabilizer having suitable vents so that the pressures of the nose may be transmitted to this surface through the main structure of the stabilizer. These and other variations and extensions, all within the spirit of my invention, will readily occur to those familiar with the art in adapting my device to installations of various types.

What I claim as my invention is:

1. An aircraft control surface assembly, comprising a stationary stabilizer section, a forward member movably supported from said stabilizer section in advance thereof, a control member movably supported from said stabilizer section rearwardly thereof, and means operatively interconnecting said forward member and said control member for effecting a substantially greater movement of said control member relative to said stabilizer section than the corresponding movement of said forward member relative to said stabilizer section.

2. An aircraft control surface assembly, comprising a stationary stabilizer section, a forward member pivoted by its rearward portion to the forward portion of said stabilizer section, a control member pivoted by its forward portion to the rearward portion of said stabilizer section, and means operatively interconnecting said forward member and said control member for simultaneous conjoint swinging in the same sense, and effecting swinging of said control member through an angle several times as great as the corresponding angular movement of said forward member.

3. An aircraft control assembly, comprising a forward balance member, a rearward control member, means operatively interconnecting said two members for effecting a substantially greater movement of said control member than the corresponding movement of said balance member, and means operable to vary the amount of balance member movement for a given amount of control member movement.

4. An aircraft control assembly, comprising a forward balance member pivotally mounted for swinging to either side of a neutral position, a rearward control member pivotally mounted for swinging to either side of a neutral position, means operatively interconnecting said two members for effecting conjoint swinging thereof in the same sense, and means operable to vary the angular displacement of said balance member corresponding to a given angular displacement of said control member.

5. An aircraft control assembly, comprising a forward balance member pivotally mounted by its rearward portion for swinging both sides of a neutral position, a rearward control member pivotally mounted by its forward portion for swinging both sides of a neutral position, means operatively interconnecting said two members for effecting conjoint swinging thereof in the same sense, and means automatically operable by displacement of said control member from its neutral position to vary the amount of angular displacement of said control member corresponding to a given angular displacement of said balance member.

6. An aircraft control assembly, comprising a forward balance member pivotally mounted by its rearward portion for swinging both sides of a neutral position, a rearward control member pivotally mounted by its forward portion for swinging both sides of a neutral position, means operatively interconnecting said two members for effecting conjoint swinging thereof in the same sense, and means automatically operable by movement of said control member to increase progressively the angular displacement of said balance member corresponding to a given angular displacement of said control member as said control member moves progressively farther from its neutral position.

7. An aircraft control assembly, comprising a forward balance surface, a rearward control surface, linkage operatively interconnecting said two surfaces including a lever connected to said balance surface and to said control surface, and pivoted at a point closer to the balance surface connection than to the control surface connection, for effecting a substantially greater movement of said control surface than the corresponding movement of said balance surface, and means operable to shift the pivot point of the lever to change the distance ratio between such pivot point and the two surface connections for varying the ratio of control surface movement to balance surface movement.

8. An aircraft control assembly comprising a forward balance surface mounted for movement to either side of a neutral position, a rearward control surface mounted for movement to either side of a neutral position, linkage interconnecting said balance surface and said control surface including a lever connected to said control surface and to said balance surface, and pivoted at a point closer to the balance surface connection than to the control surface connection; for effecting a substantially greater movement of said control surface than the corresponding movement of said balance surface, and means automatically operable by movement of said control surface in a direction away from neutral position to shift the pivot point of said lever away from the balance surface connection, thereby to increase the movement of said balance surface for a corresponding movement of said control surface as the latter moves farther from its neutral position.

9. The aircraft control assembly of claim 8, and means operable to vary the amount of pivot shift effected by the latter means for a given movement of the control surface away from its neutral position.

10. The aircraft control assembly of claim 8, and means to vary the position of the control surface deflected from its neutral position at which movement of the lever's pivot away from the balance surface connection commences.

11. An aircraft control surface assembly, comprising a stationary stabilizer section, a forward balance section pivoted by its rearward portion to the forward portion of said stabilizer section, a control surface section pivoted by its forward portion to the rearward portion of said stabilizer section, and linkage within the stationary central section including a lever connected to said balance section and to said control section for conjoint swinging in the same sense, said lever being pivoted at a point closer to the balance section connection than to the control section connection therewith for effecting swinging of said control section through an angle substantially greater than the corresponding angular movement of said balance section.

12. An aircraft control surface assembly, comprising a stationary stabilizer section, a forward balance section pivoted by its rearward portion to the forward portion of said stabilizer section, a control surface section pivoted by its forward portion to the rearward portion of said stabilizer section, and linkage within the stationary central section including a lever having one end connected to said balance section and its other end connected to the control section, and a pivot for said lever disposed between the balance section and control section connections, and in a position several times as far from the control surface connection as from the balance section connection for effecting swinging of said control section through an angle several times as great as the corresponding angular movement of said balance section.

13. An aircraft control surface assembly as defined in claim 11, including a lever fixedly pivoted upon the stationary stabilizer section, and carrying the first lever pivot, said second lever being swingable to move the first lever pivot carried thereby lengthwise of such first lever for varying the proportionality of the distances between the first lever pivot and the balance section and control section connections.

14. An aircraft control surface assembly as defined in claim 11, including a lever fixedly pivoted upon said stationary stabilizer section, and carrying the first lever pivot, said second lever being swingable to move the first lever pivot carried thereby lengthwise of such first lever for varying the proportionality of the distances between the first lever pivot and the balance section and control section connections, and means shiftable by movement of the control section away from neutral position to swing said second lever in a direction to move the first lever pivot away from the balance section connection with the first lever, thereby automatically to increase the angular movement of the balance section for a given angular movement of the control section as the latter moves farther from its neutral position.

15. An aircraft control surface assembly, comprising a stationary stabilizer section, a forward balance section pivoted by its rearward portion to the forward portion of said stabilizer section, a control surface section pivoted by its forward portion to the rearward portion of said stabilizer section, linkage interconnecting the balance section and the control section including a lever extending generally parallel to the pivot axes of said balance and control sections, and having one end operatively connected to swing said balance section and the other end operatively connected to swing said control section, a pivot for said lever disposed closer to said balance section connection than to said control section connection, a second lever fixedly pivoted to said stationary stabilizer section, and carrying said pivot for the first lever, an operating rod extending generally parallel to said first lever, and reciprocable to swing said second lever for shifting the first lever pivot carried thereby to alter the ratio of the distances between the first lever pivot and the balance surface and control surface connections, respectively, for changing the movement ratio of the balance and control sections, and manual control means for shifting said operating lever to alter the position of said first lever pivot.

16. The aircraft control surface assembly of claim 15, and means operated by movement of the control section in a direction away from its neutral position to shift the second lever control rod in a direction to move the first lever pivot for decreasing the ratio of control surface connection to first lever pivot length with respect to balance surface connection to first lever pivot length.

17. An aircraft control surface assembly, comprising a stationary stabilizer, a member movably supported from the forward portion of said stabilizer, a control member movably supported from said stabilizer rearwardly thereof, and means operatively interconnecting said first member and said control member for effecting a substantially greater movement of said control member relative to said stabilizer than the corresponding movement of said first member relative to said stabilizer.

ROLAND J. WHITE.